(12) United States Patent  
Liu

(10) Patent No.: US 7,661,914 B2
(45) Date of Patent: Feb. 16, 2010

(54) LOOSENING-PROOF METHOD USED FOR A SCREW FASTENING UNIT AND THE DEVICE THEREOF

(75) Inventor: Yuen Liu, Xiamen (CN)

(73) Assignee: Xiamen Yuchengjie Electromechanical Science & Technology Co., Ltd, Xiamen, P.R. (CN)

( * ) Notice: Subject to any disclaimer, the term of this patent is extended or adjusted under 35 U.S.C. 154(b) by 344 days.

(21) Appl. No.: 11/660,840

(22) PCT Filed: Jul. 21, 2004

(86) PCT No.: PCT/CN2004/000836

§ 371 (c)(1),
(2), (4) Date: Feb. 20, 2007

(87) PCT Pub. No.: WO2005/083278

PCT Pub. Date: Sep. 9, 2005

(65) Prior Publication Data

US 2008/0019800 A1    Jan. 24, 2008

(30) Foreign Application Priority Data

Feb. 27, 2004    (CN)    .......................... 2004 2 0080262
May 24, 2004    (CN)    .......................... 2004 1 0443186

(51) Int. Cl.
    *F16B 39/32*    (2006.01)
(52) U.S. Cl. ...................... 411/141; 411/140; 411/163; 411/180; 411/952
(58) Field of Classification Search ......... 411/162–165, 411/160, 187, 188, 147, 149, 140, 191, 216, 411/217, 949, 950, 952, 953, 957, 962, 327, 411/141
See application file for complete search history.

(56) References Cited

U.S. PATENT DOCUMENTS

| 778,853   | A | * | 1/1905  | Gary ........................... 411/227 |
| 903,255   | A | * | 11/1908 | Wilkin ......................... 411/141 |
| 1,034,697 | A | * | 8/1912  | Darling ........................ 411/162 |
| 1,077,425 | A | * | 11/1913 | Old ............................. 411/141 |
| 1,234,830 | A | * | 7/1917  | Everdingen .................. 411/141 |
| 2,256,851 | A | * | 9/1941  | Schnorr ....................... 411/162 |
| 5,707,193 | A |   | 1/1998  | Hasegawa |

FOREIGN PATENT DOCUMENTS

| CN | 2226168 Y   | 5/1996 |
| CN | 2473375 Y   | 1/2002 |
| EP | 0 930 493 A1 | 7/1999 |
| JP | 2000-9127   | 1/2000 |

* cited by examiner

*Primary Examiner*—Gary Estremsky
(74) *Attorney, Agent, or Firm*—Rabin & Berdo, P.C.

(57) ABSTRACT

A loosening-proof screw fastening device, including at least one stop wheel on at least one of a plurality of contacting faces; the at least one stop wheel is rotatably assembled in a locating hole on said at least one contacting face with its stop tooth slightly protruded beyond the contacting face; upon application of a backward action force for loosening the fastening device a created torque will bring the at least one stop wheel into rotation and make a stop tooth of the at least one stop wheel protrude beyond the contacting face and penetrate into a surface closely opposed to the at least one contacting face for preventing the fastening device from loosening.

7 Claims, 6 Drawing Sheets

C

LOOSENING-PROOF METHOD USED FOR A SCREW FASTENING UNIT AND THE DEVICE THEREOF

TECHNICAL FIELD

This invention relates to a loosening-proof method and an associated device, which locks a fastened object through the action of bolt, stud, nut or the like, especially a mechanical loose-proof method and its device.

BACKGROUND

Nowadays, a screw fastening device comprises a bolt connection, bolt-nut connection and a double-end bolt-nut connection. These loosening-proof methods and devices include:

(1) Friction Loosening-Proof

This method usually includes double nuts and an elastic gasket. The double nuts provide additional pressure and friction to the screw threads. However, it is limited to the stable, low speed and heavy-loaded screw fastening devices while not violent impact or vibrancy. The elastic gasket loosening-proof means provide a counter force. The pressed elastic gasket makes the screw threads (of both the bolts and nuts) press intensively and the inclined tips of the gaskets are set in opposition to the nuts as well as the contacting face of the fastened object, so that the loosening-proof could be realized. Such a method or device also has its own shortage so that the angle of rotation for loosening-proof lies in 3-4° and is not suitable for fastening units with violent impact or vibrancy.

(2) Mechanical Loosening-Proof

This method usually includes a cotter dowel and a grooved hexagonal nut. The method is realized by inserting the cotter dowel into the small hole of the common bolt or double-end bolt and the groove of the nut. The rear part of the cotter dowel is pulled apart and alongside the nut. The shortages of this method and device are the limitation to its use circumstances, for example it can not be used for countersinking and is inconvenient to install or uninstall.

(3) Material Loosening-Proof

This method usually includes applying liquid adherent between the screw threads. The shortage of this method is that it is inconvenient to uninstall and it can not be reused or can be reused for limited times.

(4) Riveting Loosening-Proof

A rivet is inconvenient to uninstall and can not be reused, so it is limited to its usage.

SUMMARY OF THIS INVENTION

The object of this invention is to provide a loosening-proof method used for a screw fastening device that has a simple structure, and convenient operation, and is low cost and effective.

The loosening-proof solution of this screw fastening device is based on such a principle that at least one stop wheel can be rotatably provided in a locating hole, which is set in at least one contacting face of the screw fastening device and the stop tooth of the stop wheel protrudes beyond the contacting face. When a backward action force for loosening the fastening device is applied on it, a torque will be created. The torque will bring the stop wheel into rotation and make the stop tooth of the stop wheel protrude beyond the contacting face and penetrate into a surface closely opposed to the contacting face to prevent the fastening device from loosening.

The devices of this invention are as follows:

A loosening-proof device for a screw fastening device, which has at least one contacting face, that is the interface of the fastening device; at least one locating hole set vertically to the contacting face; and at least one stop wheel actively located in a locating hole in a vertical direction.

The contacting face of this invention is vertical to the axial direction of the screw threads.

The locating hole of this invention is a quadrate hole with its length fit to the diameter of the stop wheel and width fit to the thickness of the stop wheel.

The stop wheel of this invention has at least one stop tooth.

The stop wheel of this invention has a main body where the sectional view is round in shape and a stop tooth integrally fixed on it.

The stop tooth of this invention is formed by two intersecting tangent planes with their internal angle range of $70° \leqq \Phi \leqq 120°$ or by two smoothly intersecting inner tangent circular arcs.

The internal angle of the stop wheel of this invention is $85 \pm 5°$.

The loosening-proof device of this invention comprises: a contacting face, that is the contacting face on the lower side of the fastened bolt; three locating blind holes, which are located on the contacting face symmetrically and vertically; three stop wheels, each vertically assembled in the blind locating holes in a rotatable manner and the stop teeth protruded beyond the contacting face.

The loosening-proof device of this invention comprises: a contacting face, that is the contacting face on the fastened nut; three blind locating holes, which are located on the contacting face symmetrically and vertically; three stop wheels, each vertically located in the blind locating holes in a rotatable manner and the stop teeth protrude beyond the contacting face.

The loose-proof device of this invention comprises: a contacting face, that is the contacting face on the gasket used for fastening; three blind locating holes, which are located on the contacting face symmetrically and vertically; three stop wheels, each vertically assembled in the locating blind holes in a rotatable manner and the stop teeth protrude beyond the contacting face.

The locating hole of this invention is a blind hole, and the stop wheel has a stop tooth.

The locating hole of this invention is a through-hole, and the stop wheel has two stop teeth in two opposite places where the contacting face includes both the upside and downside contacting face of the gasket.

From the information above, we could find some priorities of this invention comparing to the background technology:

(1) When a counter force (e.g. vibrancy) is applied on the screw fastening device, the rotation of the fastened device rotate the stop wheel and the stop tooth on it will protrude out of contacting face and then penetrate into the surface closely opposed to the contacting face. In such a way, the produced resistance can prevent the fastening device from loosening. On the other hand, the stop tooth will go into the locating hole when the device is fastened and make the stop wheel rotate forward, where there will be no influence to fastening.

(2) Because the stop tooth protrudes out of the contacting face and penetrates into the surface closely opposed to the contacting face so as to bring the resistance, the user will need more torque to loosen it than fasten it.

(3) Usually, the loosening-proof angle of this invention is 90°. The angle is relatively big and the effect of loosening-proof is reliable.

(4) All the ordinary tools could be applied to the loosening-proof device and no more special tools are needed. It is convenient to the general public.

(5) When the fastened device is loosened to the angle of 50-80°, the torque of loosening-proof will come to another peak (less maximum). It could meet the different needs for loosening-proof and is convenient for serial and standardized production.

(6) There is at least one stop tooth on the stop wheel in this invention. The produced resistance is relatively big and reliable. The sectional view of the main body of the stop wheel in this invention is round in shape, which has little friction with the locating hole.

(7) The stop tooth on the stop wheel is formed by two intersecting tangent planes with their internal angle range of $700 \leqq \Phi \leqq 1200$. When loosening the fastening device, the resistance produced is big and reliable. The device itself could be reused and is durable.

(8) The stop tooth on the stop wheel is formed by two smoothly intersecting internal tangent circular arcs so that it could be conveniently manufactured.

(9) In the situation of a bolt connection, the stop wheel is located on the downside contacting face of the head of the bolt. The rotation of the fastened device will generate the rotation of the stop wheel and the stop tooth on it will protrude beyond the contacting face and then penetrate into the surface closely opposed to the contacting face, so that the loosening-proof is effective. This is called mechanical loosening-proof. It could be used in different situations such as in changing loads, violent impact or strong vibrancy.

(10) In the situation of a bolt-nut connection, the stop wheel is located on the contacting face at the head of the bolt. The stop tooth will protrude beyond the contacting face and penetrate into the contacting face of the fastened object, which brings in big resistance and reliable loosening-proof. Alternatively, the stop wheel is located on the contacting face, which is at the downside of the nut. The stop tooth will protrude beyond the contacting face under the counter force and then penetrate into the contacting face of the fastened object or the gasket to produce big resistance and a reliable loosening-proof effect.

(11) In the situation of the double-end bolt nut connection, the stop wheel is located on the contacting face of the nut. The stop tooth will protrude beyond the contacting face under the counter force and then penetrate into the contacting face of the fastened object to produce a big resistance and reliable loosening-proof effect.

(12) The stop wheel can be located on the contacting face of the gasket. The stop tooth will protrude beyond the contacting face under the counter force and penetrate into the contacting face of the fastened object or the lower side of the nut or head of the bolt to produce the resistance and reliable loosening-proof effect.

(13) The locating hole in the gasket is a through-hole. Stop teeth are located symmetrically on the stop wheel. The stop teeth will rotatably protrude out under the counter force and penetrate into the contacting face of the fastened object as well as the nut's circular contacting area to produce big resistance and a reliable loosening-proof effect.

(14) The gasket, bolt, nut and the double-end bolt are all reusable.

(15) This could be widely adoptable and manufactured by steel, bronze, aluminum or plastics etc. according to different needs. Also, it is suitable for both left hand and right hand screws.

DRAWINGS

EMBODIMENTS

Figure 1:
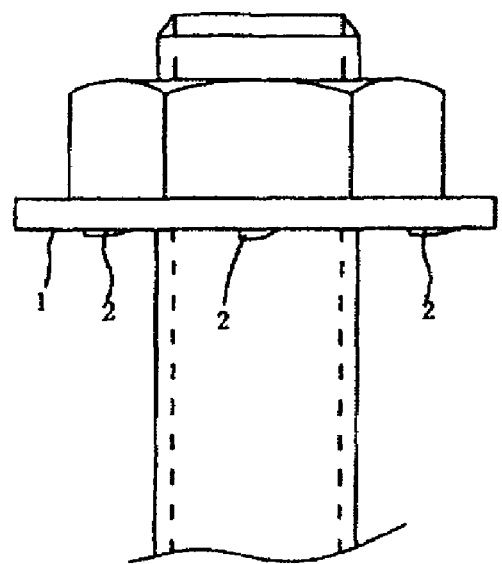
FIG. 1 shows a structural view of the fastening device according to Embodiment 1.
Figure 2:
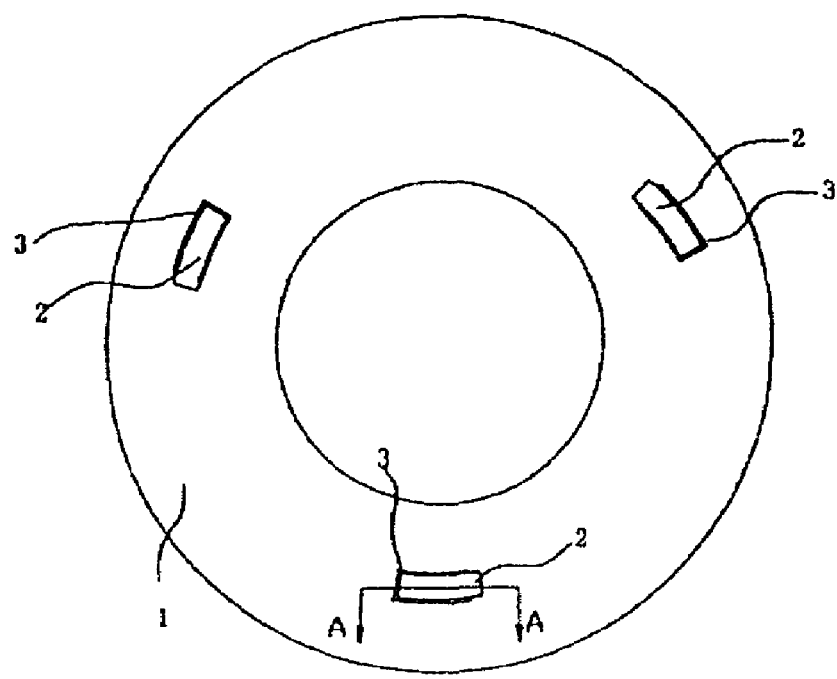
FIG. 2 shows a structural view of gasket in the fastening device according to Embodiment 1.
Figure 3:
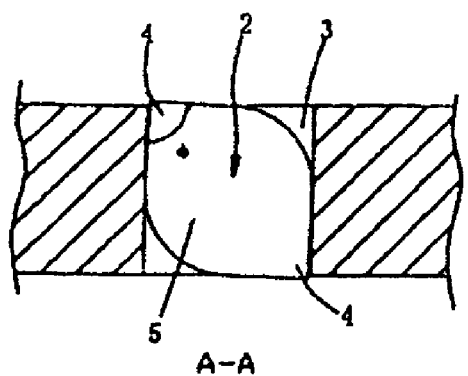
FIG. 3 shows a sectional view of the gasket of the fastening device when forward rotating along A-A in FIG. 2 according to the Embodiment 1.
Figure 4:
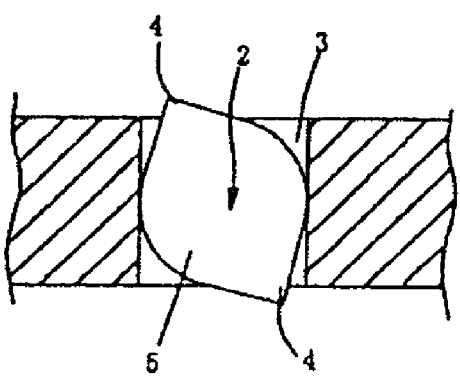
FIG. 4 shows a sectional view of the gasket of the fastening device as showed in FIG. 3 when backward rotating according to the Embodiment 1.
Figure 5:
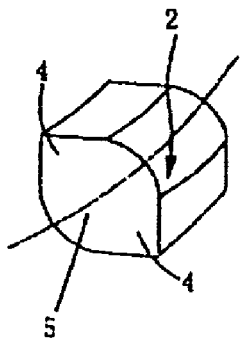
FIG. 5 shows a perspective view of a stop wheel according to Embodiment 1.

Further introduction will be made to this invention accompanying the FIG. 1-14.

Embodiment 1

In this embodiment, the screw fastening device is a bolt-nut connection including gasket.

As shown in FIGS. 1-6, the loosening-proof method of the screw fastening device is as follows: three stop wheels (2) are located on the contacting face (1) of gasket vertically. Each of them is vertically located in the locating hole (3) on the contacting face (1). One part of the stop tooth slightly protrudes beyond the contacting face and each of the stop wheels (2) can be rotated. When the backward action force (to loosen, e.g. vibrancy) is applied to the nut, the torque will bring the stop wheels (2) in the gasket to rotate backward and the stop teeth (4) of the stop wheel (2) will protrude beyond the contacting face, and penetrate into the surface closely opposed to the contacting face. In such a way, the resistance could be created and prevent the fastening device from loosening.

A loose-proof screw fastening device comprises a contacting face (1), that is the upper and lower side of the circular contacting face of the gasket; three locating holes (3), which are located on the contacting face (1) in a symmetrical and vertical manner; and three stop wheels (2), which are located in each locating through-hole (3) in a vertical and rotatable manner.

Figure 6:
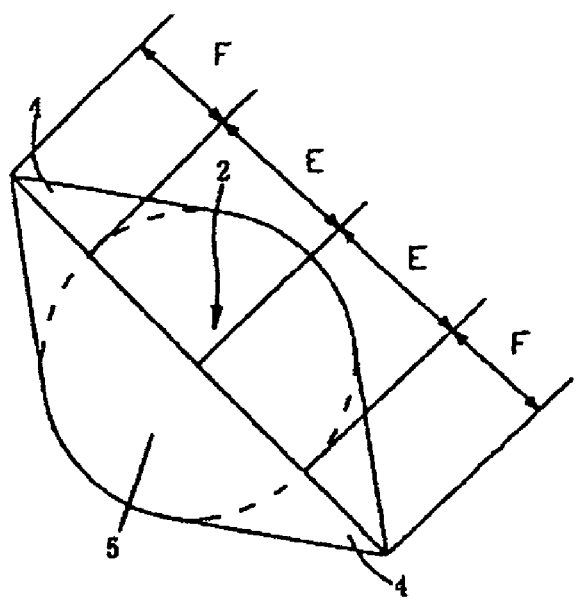
FIG. 6 shows a sectional view of a stop wheel according to Embodiment 1.

As shown in FIGS. 2, 4-6, stop wheel (2) comprises a main body (5) with its sectional view being round in shape and two stop teeth (4) symmetrically fixed to the edge of the main body (5). The stop teeth (4) are formed by two tangent planes of the stop wheel (2) with the internal angle range of 700≦Φ≦1200, and more preferably 85±5°. The main body (5) and the two stop teeth (4) are integrally made. As FIG. 6 shows, the maximum of the radius of stop wheel (2) is the sum of E and F, and the minimum is E, the radius of the main body (5).

As shown in FIGS. 2, 4-6, a backward action force (to loosen) is applied to the nut, where the torque created will bring the stop wheel (2) into rotation, and each of the stop teeth (4) on the stop wheel (2) will penetrate in to the surface closely opposed to the contacting face on the fastened object and the circular contacting face on the nut to create the resistance for making it loosening-proof. When the angle is loosened to 50-80°, the loosening-proof torque will come to another peak (less maximum). The biggest resistance will be reached when the stop tooth's depth into the contacting face of the fastened object is F.

The processing of the device in this invention could be as follows: (1). Processing of the locating hole (3); (2). Locating the stop wheel (2) to the locating hole (3) and adjusting the stop wheel (2) to a proper position with its stop teeth (4) following the screw fastening direction; (3). Applying pressure against the two faces of the gasket and the two ends of the locating hole (3) will become closer under the pressure; (4). The closer endings fix the stop wheel (2).

Embodiment 2

Figure 7:
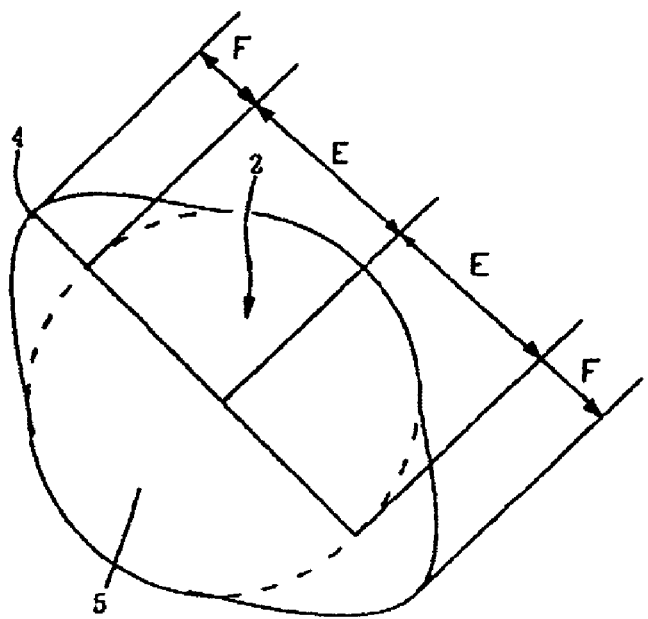
FIG. 7 shows a sectional view of a stop wheel according to Embodiment 2.
Figure 8:
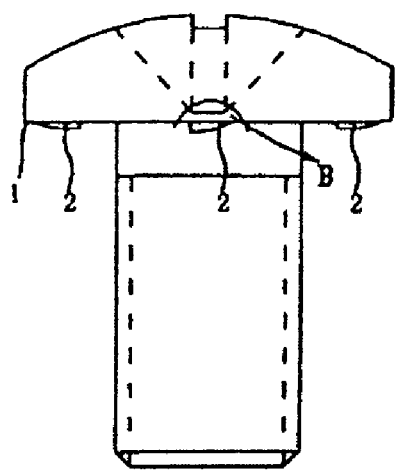
FIG. 8 shows a structural view of a fastening device according to Embodiment 3.

FIG. 7 shows a loosening-proof screw fastening device. The difference with Embodiment 1 is: stop teeth (4) are formed by two smoothly intersecting tangent circular arcs of the main body (5) with the internal angle range of 700≦Φ≦1200, and 85±5° is preferred. The main body (5) and stop teeth (4) of the stop wheel (2) are integrally made. The maximum of the radius of stop wheel (2) is the sum of E and F, and minimum is E, the radius of the main body (5).

Embodiment 3

Fastening device with bolt connection.

As shown in FIGS. 8-11, the lower circular area of the head of bolt is the contacting face (1); three blind locating hole (3) located on the contacting face (1) in a symmetrical and vertical manner; each of the three stop wheels (2) located in the blind locating holes (3) in a rotatable and vertical manner and the part of the stop teeth (4) of the stop wheel (2) is slightly protruded out of the contacting face.

Figure 9:
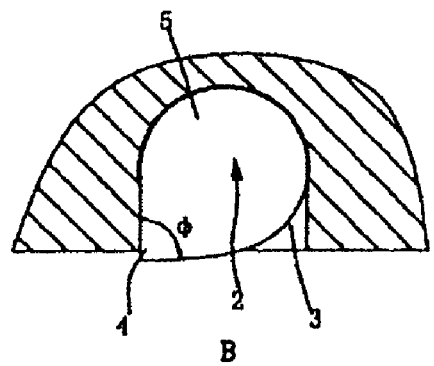
FIG. 9 shows a partial sectional view of the fastening device along B-B in FIG. 8 according to Embodiment 3 when it is rotating forward.
Figure 10:
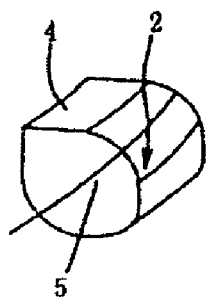
FIG. 10 shows a perspective view of a stop wheel in Embodiment 3.
Figure 11:
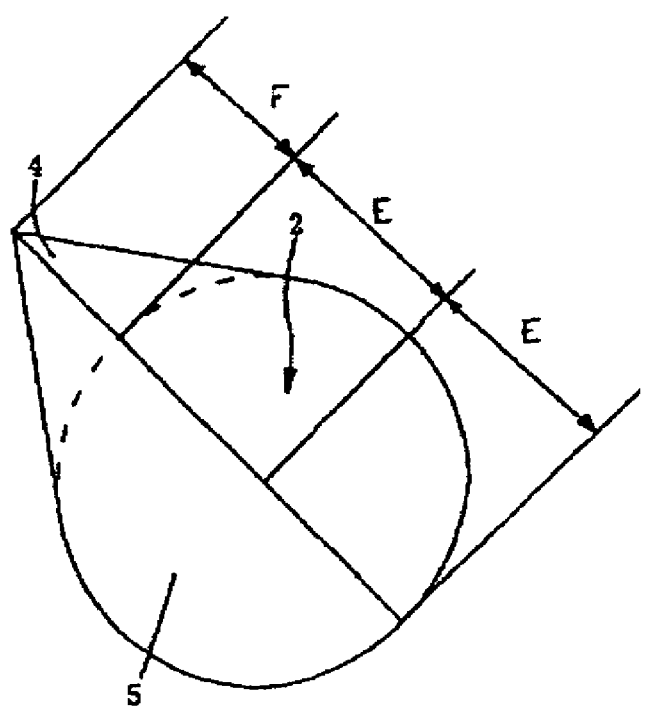
FIG. 11 shows a sectional view of a stop wheel in Embodiment 3.

As FIGS. 9-11 show, stop wheel (2) comprises a main body (5) with its sectional view is round in shape and stop teeth (4) fixed to it. The stop teeth (4) is formed by two smoothly intersecting tangent circular arcs of main body (5) with the internal angle range of 70°≦ΦΘ120°, and more preferably 85±5°. The main body (5) and stop teeth (4) of the stop wheel (2) are integrally made. As shown in FIG. 9, the maximum of the radius of stop wheel (2) is the sum of E and F, and minimum is E, the radius of the main body (5).

As shown in FIGS. 9-11, when the backward action force is applied to the bolt, the created torque will bring the stop wheel (2) into rotation. The stop tooth (4) of the stop wheel will protrude beyond the contacting face and penetrate into the contacting face of the fastened object, therefore the resistance is created to make it loosening-proof. The biggest resistance will be reached when the stop tooth's depth into the contacting face of the fastened object is F.

The processing of the device in this invention could be as follows: (1). Processing of the locating hole (3); (2). Locating the stop wheel (2) to the locating hole (3) and adjusting the stop wheel (2) to a proper position with its stop teeth (4) following the screw fastening direction; (3). Applying pressure against the two faces of the gasket and the two ends of the locating hole (3) will become closer under the pressure; (4). The closer endings fix the stop wheel (2).

Embodiment 4

The fastening device in this Embodiment is a nut.

Figure 12:
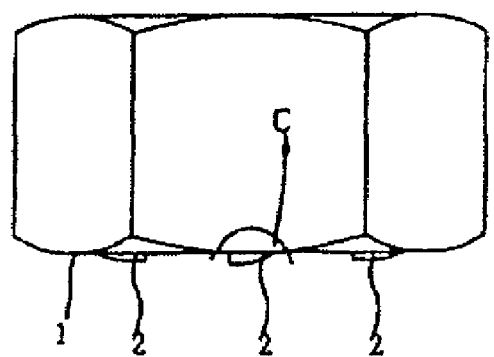
FIG. 12 shows a structural view of the fastening device in Embodiment 4.
Figure 13:
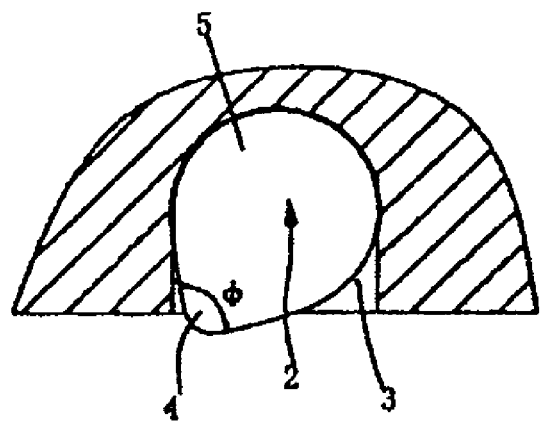
FIG. 13 shows a partial sectional view of the fastening device along C-C in FIG. 12 according to Embodiment 4 when forward rotating.
Figure 14:
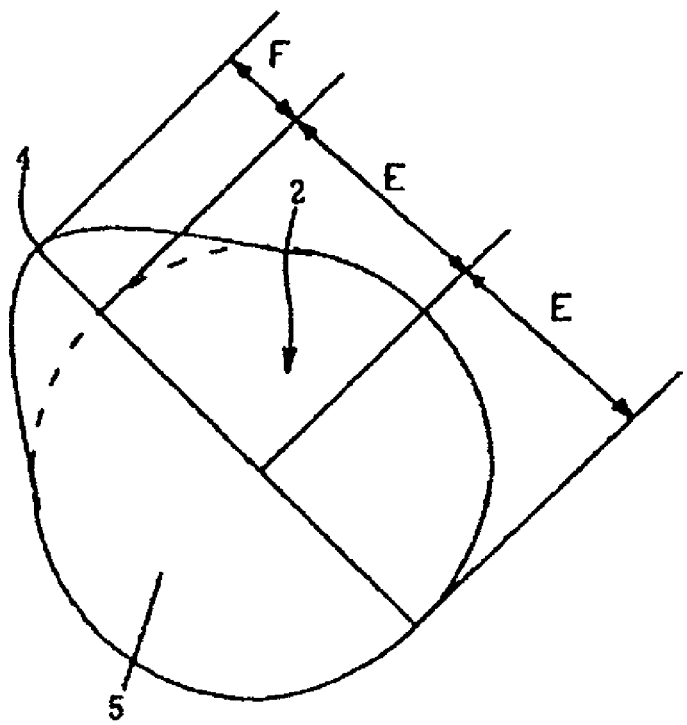
FIG. 14 shows a sectional view of a stop wheel in Embodiment 4.

As shown in FIGS. 12-14, the contacting face (1) is the circular area on the lower side of the nut. Three locating holes (3) are located on the contacting face in a vertical and symmetrical manner. Each of the three stop wheels (2) are located in its blind locating holes (3).

The stop wheel (2) comprises a main body (5) where its sectional view is round in shape and stop teeth (4) fixed to it. The stop teeth (4) are formed by two smoothly intersecting tangent circular arcs of main body (5). The main body (5) and stop teeth (4) of the stop wheel (2) are integrally made. The maximum of the radius of stop wheel (2) is the sum of E and F, and minimum is E, the radius of the main body (5).

When a backward action force is applied to the bolt, the created torque will rotate the stop wheel (2). The stop tooth (4) of the stop wheel will protrude beyond the contacting face and penetrate into the contacting face of the fastened object to create the resistance to make it loosening-proof.

The manufacture of the device in this invention could be as follows: (1). Processing of the locating hole (3); (2). Locating the stop wheel (2) to the locating hole (3) and adjusting the stop wheel (2) to a proper position with its stop teeth (4) following the screw fastening direction; (3). Fixing the locating sleeve to the lower side of the nut, then drilling three through-holes corresponding to each of the blind locating holes (3) with its radius being smaller than that of the locating hole (3).

Given the above, the nut in this Embodiment could be applied to the double-end bolt fastening device.

The description from above is merely some of the preferable embodiments and should not be considered as the limitation to this invention.

Any changes or decorations to this invention remain in the scope of this invention as long as the changed or decorated ones share the same effects with this invention.

INDUSTRIAL APPLICATION

The screw fastening device has the priority of a simple structure and low cost for manufacture and could be applied for massive production, so it is good for industrial application.

The invention claimed is:

1. A loosening-proof fastening device for fastening a fastener, comprising:
   a gasket including at least one contacting face, said at least one contacting face being transverse to a longitudinal axis of the fastener;
   at least one locating hole, which is set on said at least one contacting face with an axial direction parallel to the longitudinal axis of the fastener and transverse to said at least one contacting face; and
   at least one stop wheel rotatably mounted in said at least one locating hole, said at least one locating hole being a through hole and said at least one stop wheel having two stop teeth at opposing places on said stop wheel, said at least one contacting face referring to both of the contacting faces on the two sides of the gasket.

2. The loosening-proof screw fastening device of claim 1, in which said at least one stop wheel has a main body with a circular cross section and at least one stop tooth fixed to an edge of said main body.

3. The loosening-proof screw fastening device of claim 2, in which said at least one stop tooth is formed by two intersecting tangent planes with an internal angle range of $70° \leq \Phi \leq 120°$.

4. The loosening-proof screw fastening device in claim 1, in which said device has:
   a contacting face, that is a lower circular contacting face of a head of a bolt or a stud;
   three blind locating holes, which are symmetrically set on said at least one contacting face; and
   three stop wheels, each of which is rotatably assembled in a corresponding one of said blind locating holes.

5. The loosening-proof screw fastening device of claim 1, in which the said device has:
   a contacting face, that is a circular contacting face of a nut which serves as a fastening unit;
   three blind locating holes, which are symmetrically set on said contacting face; and
   three stop wheels, each of which is rotatably assembled in a corresponding one of said blind locating holes.

6. The loosening-proof screw fastening device of claim 1, in which said loosening-proof device has:
   a contacting face, that is a circular contacting face of the gasket which serves as a fastening unit;
   three blind locating holes, which are symmetrically set on said contacting face; and
   three stop wheels, each of which is rotatably assembled in a corresponding one of said blind locating holes.

7. The loosening-proof screw fastening device of claim 2, wherein said at least one stop tooth is formed by two smoothly intersecting tangent circular arcs of said main body.

* * * * *

UNITED STATES PATENT AND TRADEMARK OFFICE
CERTIFICATE OF CORRECTION

PATENT NO. : 7,661,914 B2  Page 1 of 1
APPLICATION NO. : 11/660840
DATED : February 16, 2010
INVENTOR(S) : Yuen Liu It is certified that error appears in the above-identified patent and that said Letters Patent is hereby corrected as shown below:

Title page Item (73), Change Assignee's name to

--Xiamen Yushengjie Electromechanical Science & Technology Co., Ltd--.

Signed and Sealed this

Thirteenth Day of April, 2010

David J. Kappos
*Director of the United States Patent and Trademark Office*